United States Patent
Okabe et al.

(10) Patent No.: US 11,176,252 B2
(45) Date of Patent: Nov. 16, 2021

(54) INTRUSION PREVENTION DEVICE, INTRUSION PREVENTION METHOD, AND INTRUSION PREVENTION PROGRAM

(71) Applicants: NIPPON TELEGRAPH AND TELEPHONE CORPORATION, Tokyo (JP); MITSUBISHI HEAVY INDUSTRIES, LTD., Tokyo (JP)

(72) Inventors: Keiichi Okabe, Tokyo (JP); Takaaki Koyama, Tokyo (JP); Jun Miyoshi, Tokyo (JP); Yoshihiro Itoh, Tokyo (JP); Naohiko Yoshizumi, Tokyo (JP); Tetsuo Takahashi, Tokyo (JP); Yuki Mori, Tokyo (JP); Toshiyuki Yamada, Tokyo (JP); Naoki Yamasaki, Tokyo (JP)

(73) Assignees: NIPPON TELEGRAPH AND TELEPHONE CORPORATION, Tokyo (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 131 days.

(21) Appl. No.: 16/344,563

(22) PCT Filed: Sep. 26, 2017

(86) PCT No.: PCT/JP2017/034809
§ 371 (c)(1),
(2) Date: Apr. 24, 2019

(87) PCT Pub. No.: WO2018/083913
PCT Pub. Date: May 11, 2018

(65) Prior Publication Data
US 2019/0294794 A1    Sep. 26, 2019

(30) Foreign Application Priority Data

Nov. 1, 2016  (JP) .............................. JP2016-214566

(51) Int. Cl.
*G06F 21/56* (2013.01)
*G06F 13/00* (2006.01)
(Continued)

(52) U.S. Cl.
CPC ............ *G06F 21/566* (2013.01); *G06F 13/00* (2013.01); *G06F 21/55* (2013.01); *G06F 21/567* (2013.01);
(Continued)

(58) Field of Classification Search
CPC ........ G06F 21/566; G06F 13/00; G06F 21/55; G06F 21/567; G06F 2221/034; G16Z 99/00
See application file for complete search history.

(56) References Cited

U.S. PATENT DOCUMENTS 9,245,147 B1   1/2016  Williams et al.
9,684,347 B2 *  6/2017  Grubbs ................ G05B 19/409
(Continued)

FOREIGN PATENT DOCUMENTS

EP   2 892 199 A1   7/2015
EP   2911362 A2 *  8/2015  ........... G06F 21/552
(Continued)

OTHER PUBLICATIONS

Mark Vle Controller DCS Block Library, 2008, p. 8, 566 and 563 (Year: 2008).*
(Continued)

*Primary Examiner* — Peter C Shaw
*Assistant Examiner* — Zhe Liu
(74) *Attorney, Agent, or Firm* — Birch, Stewart, Kolasch & Birch, LLP.

(57) ABSTRACT

An intrusion prevention device includes a reception unit, a monitoring unit, and a determination unit. The reception unit receives, from a control target device, a notification indi-
(Continued)

cating a state of the control target device. The monitoring unit receives a control command transmitted from a control device to the control target device. The determination unit determines whether to permit or block passage of the control command received by the monitoring unit in accordance with the state of the control target device received by the reception unit.

6 Claims, 9 Drawing Sheets

(51) Int. Cl.
*G16Z 99/00* (2019.01)
*G06F 21/55* (2013.01)

(52) U.S. Cl.
CPC ........ *G16Z 99/00* (2019.02); *G06F 2221/034* (2013.01)

(56) References Cited

U.S. PATENT DOCUMENTS

| | | | | |
|---|---|---|---|---|
| 2007/0116292 | A1* | 5/2007 | Kurita | G06F 21/34 380/270 |
| 2007/0180521 | A1* | 8/2007 | Malkin | G06Q 30/0242 726/22 |
| 2009/0265361 | A1* | 10/2009 | Nagami | H04L 63/0853 |
| 2013/0212420 | A1* | 8/2013 | Lawson | G05B 19/4185 713/400 |
| 2013/0290763 | A1* | 10/2013 | Katsumata | G06F 11/2038 713/330 |
| 2014/0020083 | A1* | 1/2014 | Fetik | G06F 21/552 726/11 |
| 2014/0207261 | A1 | 7/2014 | Grubbs et al. | |
| 2014/0317717 | A1* | 10/2014 | Lee | H04L 63/0209 726/11 |
| 2014/0366119 | A1* | 12/2014 | Floyd, III | H04L 47/32 726/13 |
| 2015/0215279 | A1* | 7/2015 | Fischer | H04L 63/029 726/11 |
| 2017/0279622 | A1 | 9/2017 | Yamaguchi et al. | |
| 2017/0374027 | A1* | 12/2017 | Fischer | H04L 63/0218 |
| 2019/0081970 | A1* | 3/2019 | Teramoto | H04L 63/1425 |

FOREIGN PATENT DOCUMENTS

| | | |
|---|---|---|
| JP | 2004-229148 A | 8/2004 |
| JP | 2013-109608 A | 6/2013 |
| JP | 2016-34066 A | 3/2016 |
| JP | 2016-162350 A | 9/2016 |
| WO | WO 2015/075802 A1 | 5/2015 |
| WO | WO 2016/113911 A1 | 7/2016 |
| WO | WO 2016/154036 A1 | 9/2016 |

OTHER PUBLICATIONS

Transparent Ready Products Web-enabled Power and Control, datasheet [online], Telemecanique, 2006 [retrieved on Jul. 12, 2021], retrieved from the internet: <URL: https://download.schneider-electric.com/files?p_enDocType=Catalog&p_File_Name=MKTED205102EN-US.pdf> (Year: 2006).*
Office Action dated Jun. 18, 2019 issued in corresponding Japanese Application No. 2016-214566.
Intel Corporation, "McAfee Network Security Platform", http://www.mcafee.com/jp/promos/nsp/index.aspx, searched on Aug. 18, 2016, 6 pages total.
International Search Report and Written Opinion of the International Searching Authority for International Application No. PCT/JP2017/034809, dated Nov. 21, 2017, with English translation.
Extended European Search Report dated May 7, 2020 issued in the corresponding European Application No. 17 866 759.8.
Office Action dated Dec. 16, 2020 issued in corresponding Australian Patent Application 2017354450.
Office Action dated Jan. 12, 2021 issued in corresponding Australian Patent Application 2017354450.

* cited by examiner

| STATE AFTER TRANSITION / CURRENT STATE | FULLY OPERATING | HOUSING OPERATING/ BLADE STOPPING | FULLY STOPPING |
|---|---|---|---|
| FULLY OPERATING |  | PERMISSION | PROHIBITION: WARNING |
| HOUSING OPERATING/ BLADE STOPPING | PERMISSION |  | PERMISSION |
| FULLY STOPPING | PERMISSION: CAUTION | PERMISSION |  |

PERMISSION RULE FOR DAILY WORKING TIME ZONE

FIG.6

| STATE AFTER TRANSITION / CURRENT STATE | FULLY OPERATING | HOUSING OPERATING/ BLADE STOPPING | FULLY STOPPING |
|---|---|---|---|
| FULLY OPERATING |  | PERMISSION: CAUTION | PROHIBITION: WARNING |
| HOUSING OPERATING/ BLADE STOPPING | PROHIBITION: WARNING |  | PERMISSION: CAUTION |
| FULLY STOPPING | PERMISSION: WARNING | PROHIBITION: WARNING |  |

PERMISSION RULE FOR HOLIDAY AND NIGHT TIME ZONE

FIG.7

| CURRENT STATE | TIME ZONE | PLACE |
|---|---|---|
| FULLY OPERATING | NIGHT TIME ZONE | TOKYO |

INTRUSION PREVENTION DEVICE, INTRUSION PREVENTION METHOD, AND INTRUSION PREVENTION PROGRAM

FIELD

The present invention relates to an intrusion prevention device, an intrusion prevention method, and an intrusion prevention program.

BACKGROUND

In the field of Internet technology (hereinafter, referred to as an IT (Information Technology)), cyber attacks such as malware and distributed denial of service attack (DDoS) have been made, and security technologies such as an intrusion detection system (IDS), an intrusion prevention system (IPS), and a firewall (FW) have been developed. These technologies have started to be introduced into an operational technology (hereinafter, referred to as an OT).

In IT, all pieces of information in a network are assumed to be information assets, and an object of security assurance is to prevent the value of the assets from being lost due to leakage, deletion, alteration, and the like. In contrast, in the field of OT, it is required to prevent a situation in which a control target device poses danger to an important infrastructure itself or a life of a person who uses the infrastructure, as the object of security assurance.

Figure 13:
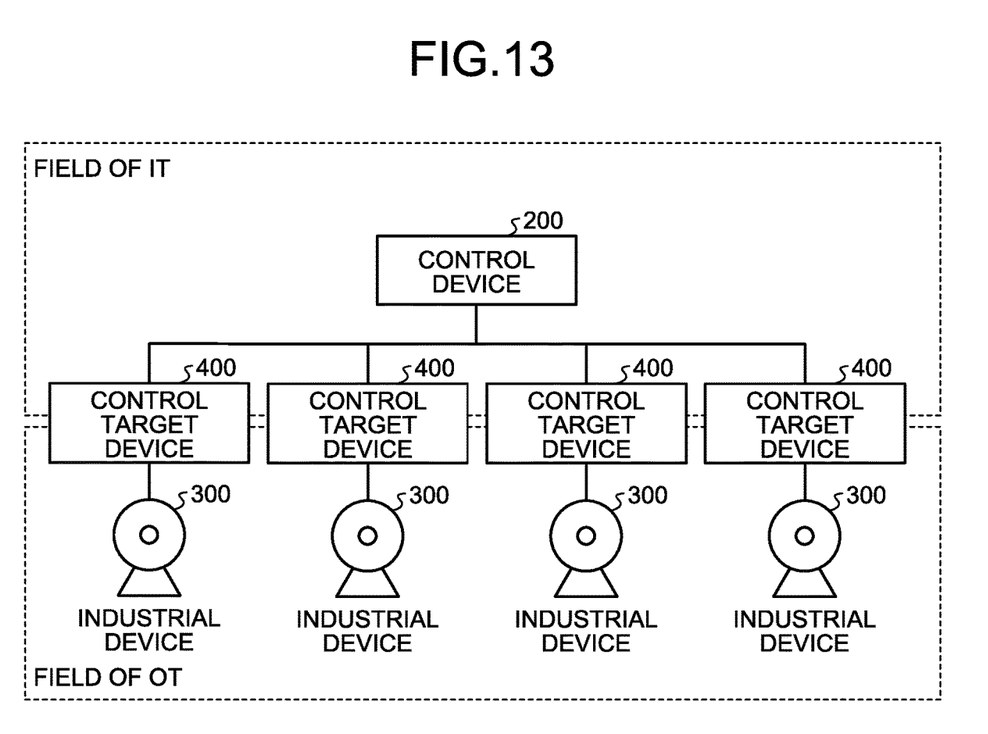
FIG. 13 is a schematic diagram illustrating the entire configuration of an industrial system in the related art.

In industrial systems, a control device performs control by transmitting a control command as a packet to a control target device connected to an industrial device. For example, in such an industrial system, as exemplified in FIG. 13, a control device 200 on an IT side transmits a packet of a control command to each of control target devices 400 connected to respective industrial devices 300 on an OT side. FIG. 13 is a schematic diagram illustrating the entire configuration of an industrial system in the related art.

Such an industrial system can determine whether the packet transmitted from the control device 200 is an unauthorized packet not complying to a specification defined as the control command using an IDS or IPS for IT, and can block the unauthorized packet or make a notification about an anomaly.

Regarding such industrial systems, there are known interlock mechanisms that control manufacture or operation of devices such as a mechanism that prevents an operation with a procedure other than a proper procedure from being performed due to misoperation or insufficient confirmation, and a mechanism that blocks supply of raw materials to facilities when deviating from a condition for achieving normal manufacture or operation.

CITATION LIST

Non Patent Literature

Non Patent Literature 1: "McAfee Network Security Platform", [online], Intel Corporation, [searched on Aug. 18, 2016], Internet <http://www.mcafee.com/jp/promos/nsp/index.aspx>

SUMMARY

Technical Problem

However, in the related art described above, although the unauthorized packed can be blocked, a packet of a normal control command cannot be appropriately blocked depending on a state of the device. That is, in the industrial systems, a control device performs control by transmitting a control command as a packet to a control target device, but even a normal packet conforming to a specification defined as such a command may cause an abnormal state depending on a state of the control target device. In the related art, a packet of such a normal control command cannot be appropriately blocked depending on the state of the device.

Solution to Problem

To solve the above-described problem and achieve an object, an intrusion prevention device according to the present invention includes a reception unit, a monitoring unit, and a determination unit. The reception unit receives, from a control target device, a notification indicating a state of the control target device. The monitoring unit receives a control command transmitted from a control device to the control target device. The determination unit determines whether to permit or block passage of the control command received by the monitoring unit in accordance with the state of the control target device received by the reception unit.

Further, an intrusion prevention method according to the present invention is an intrusion prevention method executed by an intrusion prevention device. The method includes a reception step of receiving, from a control target device, a notification indicating a state of the control target device; a monitoring step of receiving a control command transmitted from a control device to the control target device; and a determination step of determining whether to permit or block passage of the control command received at the monitoring step in accordance with the state of the control target device received at the reception step.

Further, an intrusion prevention program according to the present invention causes a computer to execute a reception step of receiving, from a control target device, a notification indicating a state of the control target device; a monitoring step of receiving a control command transmitted from a control device to the control target device; and a determination step of determining whether to permit or block passage of the control command received at the monitoring step in accordance with the state of the control target device received at the reception step.

Advantageous Effects of Invention

According to the present invention, a normal control command can be appropriately blocked depending on a state of an device.

DESCRIPTION OF EMBODIMENTS

Embodiments of an intrusion prevention device, an intrusion prevention method, and an intrusion prevention program according to the present application will be described below in detail with reference to the drawings. The intrusion prevention device, the intrusion prevention method, and the intrusion prevention program according to the present application are not limited to the embodiments.

First Embodiment

Figure 1:
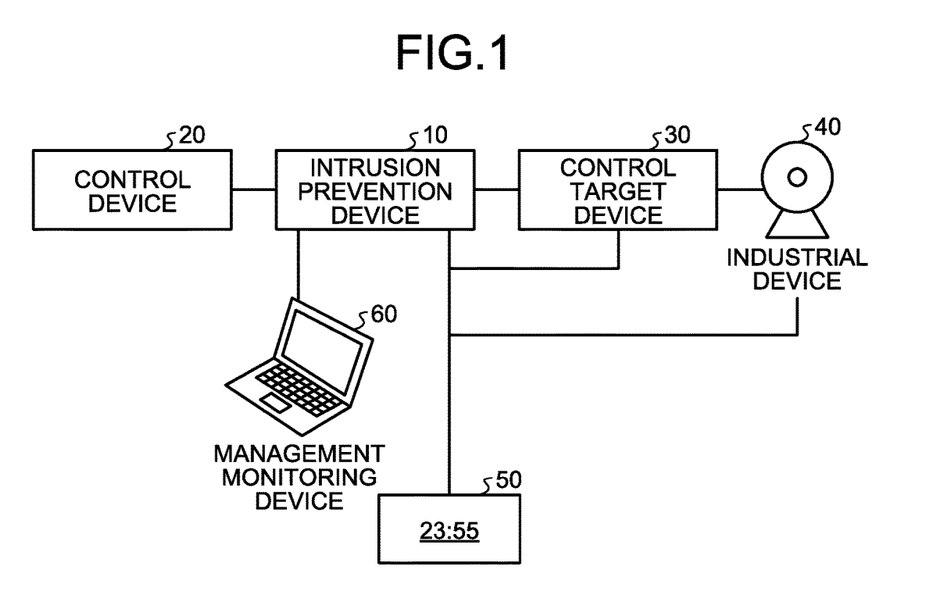
FIG. 1 is a schematic diagram illustrating the entire configuration of a monitoring control network system according to a first embodiment.

First, the following describes a configuration example of a monitoring control network system with reference to FIG. 1. FIG. 1 is a schematic diagram illustrating the entire configuration of the monitoring control network system according to a first embodiment. The monitoring control network system according to the first embodiment includes an intrusion prevention device 10, a control device 20, a control target device 30, an industrial device 40, a scheduler 50, and a management monitoring device 60. The configuration illustrated in FIG. 1 is merely an example, and a specific configuration and the number of devices are not limited.

The monitoring control network system according to the first embodiment is, for example, a system that monitors and controls various infrastructures of electric power, gas, waterworks, chemistry, petroleum, and the like. In the monitoring control network system according to the first embodiment, the control device 20 transmits a control command to the control target device 30 connected to the industrial device 40 via the intrusion prevention device 10.

The intrusion prevention device 10 periodically receives, from the control target device 30, a notification about a state of the control target device 30. When the intrusion prevention device 10 receives a packet of the control command transmitted from the control device 20 to the control target device 30, the intrusion prevention device 10 determines whether to permit or block passage of the packet of the control command depending on the state of the control target device 30. If determining to permit the passage, the intrusion prevention device 10 transmits the packet of the control command to the control target device 30. If determining to block the passage, the intrusion prevention device 10 discards the packet of the control command.

For example, the intrusion prevention device 10 blocks the packet of the control command that should not be permitted to pass depending on the state of the control target device 30 even if the packet is a packet of a normal control command. By way of specific example, when the intrusion prevention device 10 receives a control command of power interruption in a case in which the control target device 30 is a server and is in operation, for example, the intrusion prevention device 10 determines that a packet of the control command should not be permitted to pass because there may be a risk of breakdown of the server, and blocks the packet of the control command. Details about the intrusion prevention device 10 will be described later. The following appropriately describes a case in which the control target device 30 is a server by way of example.

The control device 20 transmits the control command to the control target device 30 so as to control operation and the like of the control target device 30. For example, the control device 20 transmits, to the control target device 30, a control command for instructing to turn on a power source, and a control command for instructing to interrupt the power source.

The control target device 30 is an device that operates in accordance with the control command transmitted from the control device 20. When the control target device 30 receives the control command from the control device 20, the state of the control target device 30 makes a transition corresponding to the received control command. The following describes a state transition of a server with reference to FIG. 2 by exemplifying a case in which the control target device 30 is a server having a housing that houses therein a blade.

Figure 2:
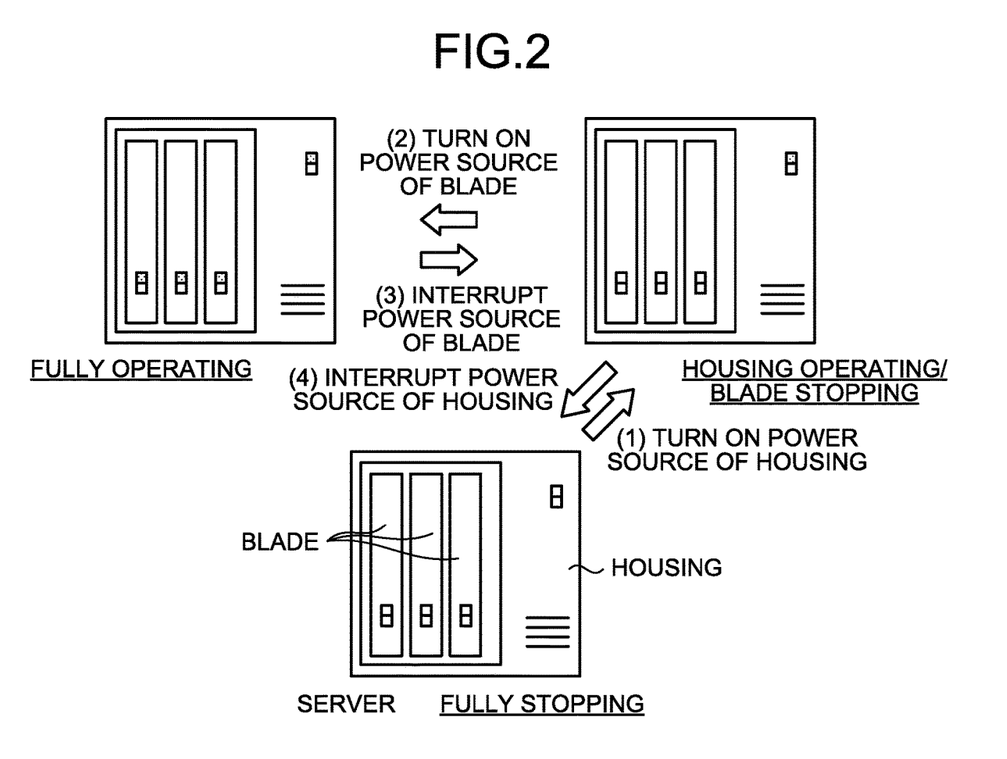
FIG. 2 is a diagram for explaining a state transition of a server.

As exemplified in FIG. 2, states of the server as the control target device 30 related to turning on the power source include "fully stopping" in which operation of the server is stopping, "housing operating/blade stopping" in which the housing is operating but the blade is stopping, and "fully operating" in which the housing and the blade are operating.

When the control command that instructs to turn on the power source of the housing is received from the control device 20 while the server as the control target device 30 is in the "fully stopping" state, the server transitions to the "housing operating/blade stopping" state (refer to (1) in FIG. 2). When the control command that instructs to turn on the power source of the blade is received from the control device 20 while the server is in the "housing operating/blade stopping" state, the server transitions to the "fully operating" state (refer to (2) in FIG. 2).

When the control command that instructs to interrupt the power source of the blade is received from the control device 20 while the server is in the "fully operating" state, the server transitions to the "housing operating/blade stopping" state (refer to (3) in FIG. 2). When the control command that instructs to interrupt the power source of the housing is received from the control device 20 while the server is in the "housing operating/blade stopping" state, the server transitions to the "fully stopping" state (refer to (4) in FIG. 2).

Figure 3:
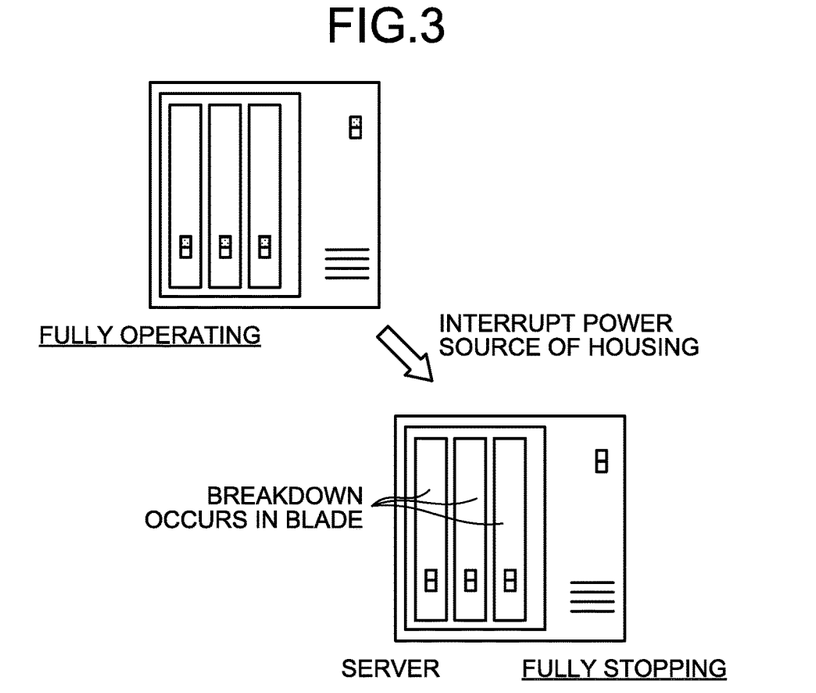
FIG. 3 is a diagram for explaining a state of a case of receiving a housing power interruption command when the server is fully operating.

The state transition exemplified in FIG. 2 is an example of a state transition that causes no problem in the server. In contrast, the following describes a state transition that may cause a problem in the server with reference to FIG. 3. As exemplified in FIG. 3, when the control command that instructs to interrupt the power source of the housing is received from the control device 20 while the server is in the "fully operating" state, the server transitions to the "fully stopping" state. In this case, the "fully operating" state in which the housing and the blade are operating is caused to make a transition to the "fully stopping" state by stopping the power sources of the housing and the blade, a breakdown may occur in the blade. Thus, the control command that causes such a state transition can be said to be a control command that should not be permitted to pass even if the control command is normal.

The industrial device 40 is an device related to infrastructure facilities that are connected to the control target device 30. For example, the industrial device 40 is a factory machine (for example, a motor or a power generator) disposed in a factory or a building, facilities of a building, and the like. The industrial device 40 is not limited to an device installed in a factory or a building, and may be, for example, a concrete mixer vehicle or a tanker that are movable for carrying objects to the factory.

The scheduler 50 is a device that manages current date and time, and a schedule for a factory or a building. The scheduler 50 determines whether the current date and time is in a daily working time zone as a working time zone on weekdays, a night time zone out of office hours, a holiday time zone that is not a working day, or the like, and transmits a state dependent on the current date and time to the intrusion prevention device 10.

The management monitoring device 60 receives a message from the intrusion prevention device 10, and monitors whether there is an anomaly in the control command transmitted from the control device 20. For example, the management monitoring device 60 receives, from the intrusion prevention device 10, a message for calling for caution to whether a problem is not caused when the control command passes, or a message for warning about an anomaly in the control command, and manually or automatically monitors whether there is an anomaly in the control command.

Configuration of Intrusion Prevention Device

Figure 4:
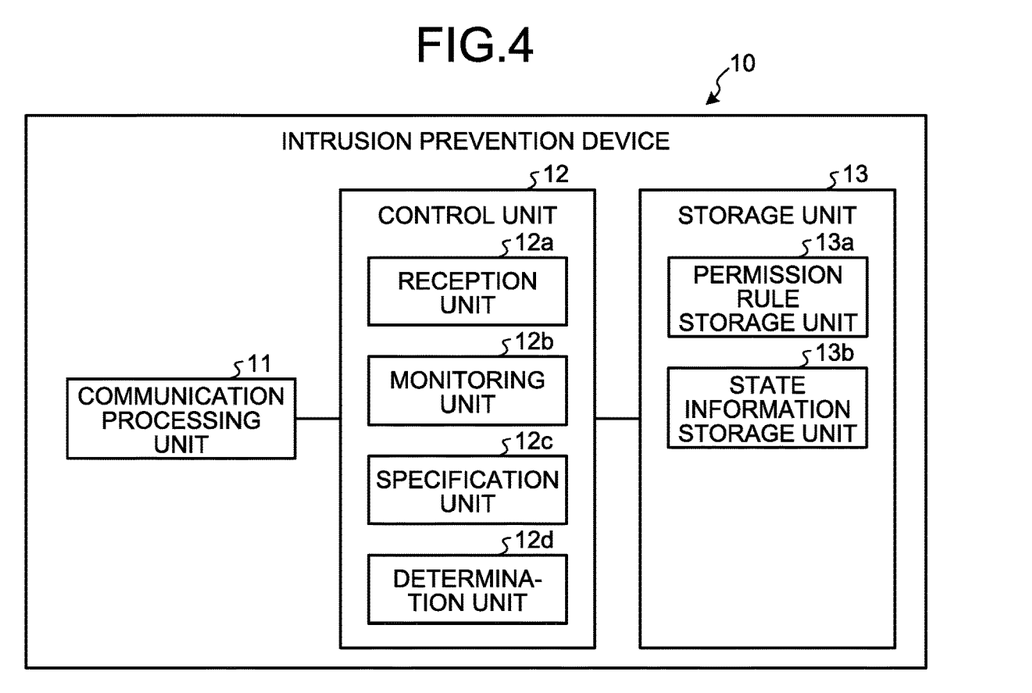
FIG. 4 is a block diagram illustrating a configuration of an intrusion prevention device according to the first embodiment.

Next, the following describes a configuration of the intrusion prevention device 10 illustrated in FIG. 1 with reference to FIG. 4. FIG. 4 is a block diagram illustrating the configuration of the intrusion prevention device according to the first embodiment. As illustrated in FIG. 4, the intrusion prevention device 10 includes a communication processing unit 11, a control unit 12, and a storage unit 13.

The communication processing unit 11 controls communication related to various pieces of information that are exchanged among the control device 20, the control target device 30, the industrial device 40, the scheduler 50, and the management monitoring device 60 that are connected to the communication processing unit 11. For example, the communication processing unit 11 receives, from the control target device 30, a notification about the state of the control target device 30. The communication processing unit 11 also receives a packet of the control command that is transmitted from the control device 20 to the control target device 30.

The storage unit 13 stores therein data and a program required for various kinds of processing performed by the control unit 12, and includes a permission rule storage unit 13a and a state information storage unit 13b as units that are especially closely related to the present invention. For example, the storage unit 13 is a semiconductor memory element such as a random access memory (RAM) and a flash memory, or a storage device such as a hard disk and an optical disc.

Figure 5:
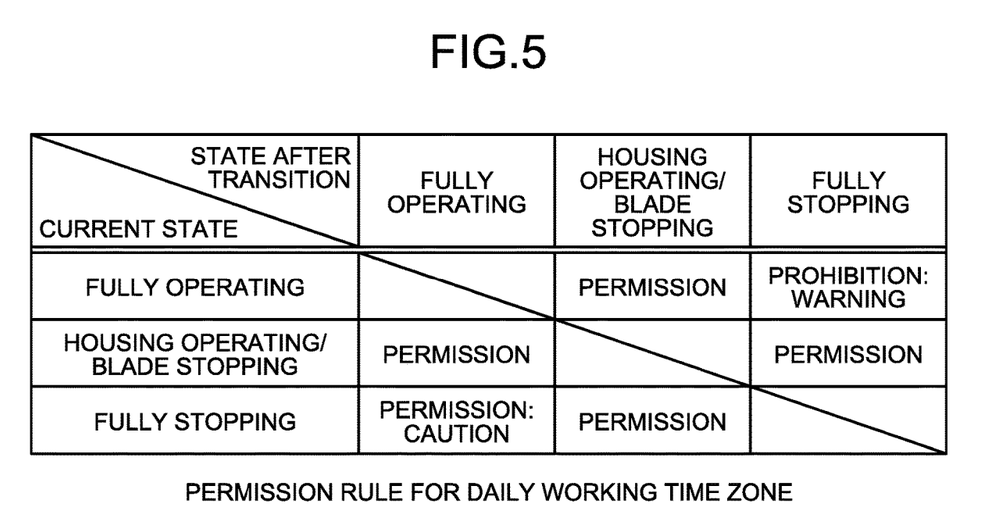
FIG. 5 is a diagram illustrating an example of a table stored in a permission rule storage unit.
Figure 6:
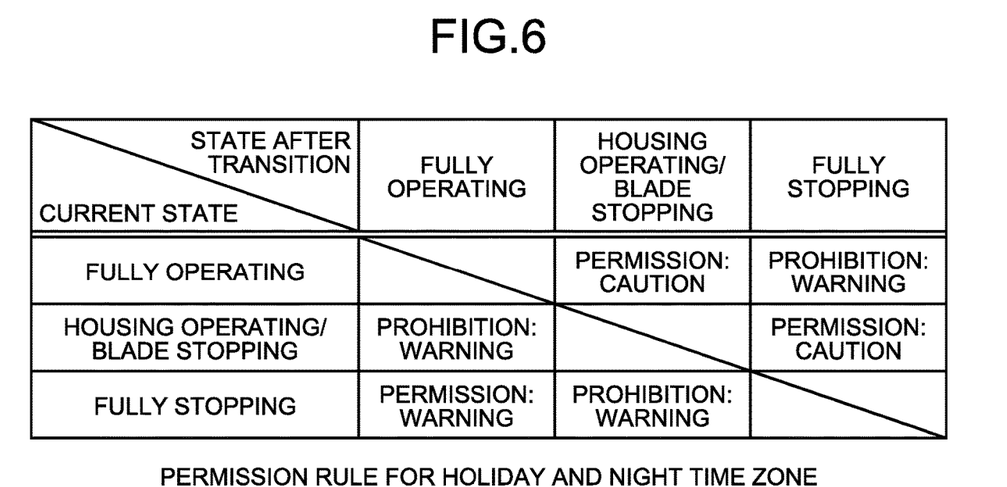
FIG. 6 is a diagram illustrating an example of a table stored in the permission rule storage unit.

The permission rule storage unit 13a stores therein a table in which processing content indicating whether to permit or block passage of the control command is specified for each pair of a current state of the control target device 30 and a state thereof after transition made by receiving the control command. In the table stored in the permission rule storage unit 13a, whether to notify the management monitoring device 60 of an anomaly is specified as the processing content. The following describes an example of the table stored in the permission rule storage unit 13a with reference to FIG. 5 and FIG. 6. FIG. 5 and FIG. 6 are diagrams each illustrating an example of the table stored in the permission rule storage unit. The table stored in the permission rule storage unit 13a is set in advance, and the content specified in the table can be appropriately changed.

The table exemplified in FIG. 5 represents a permission rule that is referred to in the daily working time zone as the working time zone on weekdays. The table exemplified in FIG. 6 represents a permission rule that is referred to in the night time zone out of office hours or the holiday time zone that is not a working day. As illustrated in FIG. 5 and FIG. 6, in the table stored in the permission rule storage unit 13a, whether to "permit" passage of the control command or "prohibit" passage of the control command is specified in association with the "current state" of the control target device 30 and the "state after transition" made by receiving the control command.

In a case in which a notification about an anomaly needs to be made, "caution" or "warning" is specified in the table stored in the permission rule storage unit 13a. The "caution" is specified for notifying the management monitoring device 60 of the message for calling for caution to whether a problem is not caused when the control command passes. The "warning" is specified for notifying the management monitoring device 60 of the message for warning about the control command.

By way of specific example, in a case in which the current state is the "fully stopping" state and the state after transition is the "fully operating" state, "permission: caution" is specified in the permission rule exemplified in FIG. 5 as the processing content. This processing content means to permit passage of the control command and notify the management monitoring device 60 of the message for calling for caution to whether a problem is not caused when the control command passes. In a case in which the current state is the "housing operating/blade stopping" state and the state after transition is the "fully operating" state, "permission" is specified in the permission rule exemplified in FIG. 5 as the processing content. This processing content means to permit passage of the control command, and means that the message is not required to be notified to the management monitoring device 60.

In a case in which the current state is the "fully operating" state and the state after transition is the "fully stopping" state, "prohibition: warning" is specified in the permission rule exemplified in FIG. 6 as the processing content. This processing content means to prohibit passage of the control command, and to notify the management monitoring device 60 of the warning message. That is, in a case in which a transition is made from the state "fully operating" state to the state "fully stopping" state, there is a risk of a breakdown in the blade of the server, so that passage of the control command is prohibited, and the warning message indicating that an inappropriate control command is transmitted is notified to the management monitoring device 60. This processing content is the same as for the permission rule in the daily working time zone of FIG. 5.

In a case in which the current state is the "fully stopping" state and the state after transition is the "fully operating" state, "permission: warning" is specified in the permission rule exemplified in FIG. 6 as the processing content. This processing content is different from "permission: caution" that is specified in the permission rule in the daily working time zone of FIG. 5. The number of cases in which the state of the server is changed from "fully stopping" to "fully operating" is smaller in a holiday night time zone as compared with the daily working time zone, so that the control command is assumed to be erroneously transmitted with high possibility. Thus, in the permission rule of the holiday night time zone exemplified in FIG. 6, processing content of permitting passage of the control command but notifying the management monitoring device 60 of the warning message is specified instead of an caution message.

Returning to the description about FIG. 4, the state information storage unit 13b stores therein information related to the state of the control target device 30 received by a reception unit 12a (described later). For example, as exemplified in FIG. 7, the state information storage unit 13b stores therein a current "time zone", a "place" at which the industrial device 40 is positioned together with the "current state" of the control target device 30. With reference to the example of FIG. 7, the state information storage unit 13b stores therein that the current state of the control target device 30 is the "fully operating" state, the time zone is the "night time zone", and the place of the industrial device 40 is "Tokyo" in the example of FIG. 7. The information about the "current state", the "time zone", and the "place" in the state information storage unit 13b is updated every time the information received by the reception unit 12a is changed.

Figure 7:
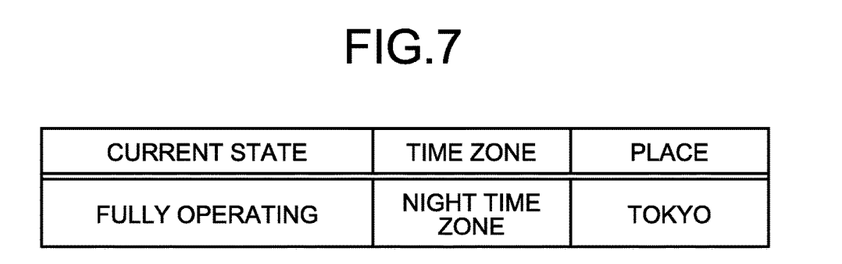
FIG. 7 is a diagram illustrating an example of information stored in a state information storage unit.
Figure 8:
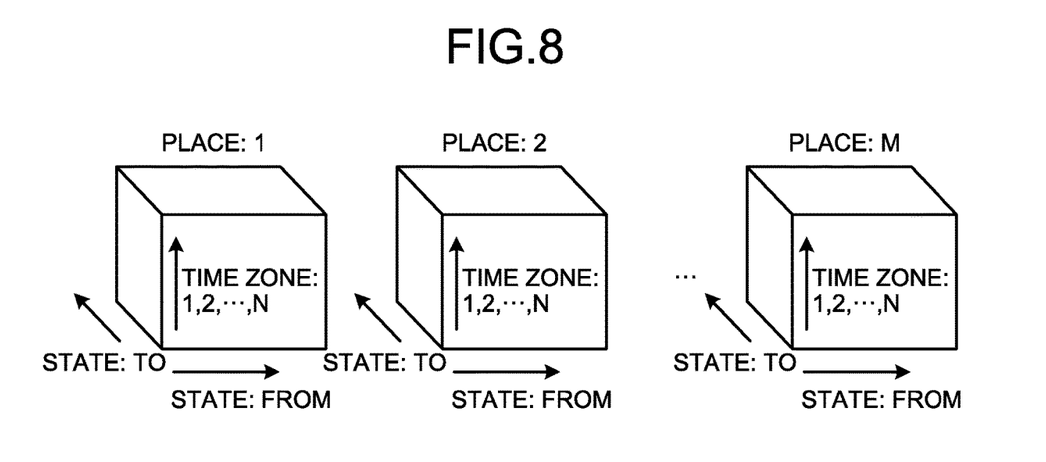
FIG. 8 is a diagram illustrating an image of a table specifying a permission rule based on a state of a control target device, a time zone, and a place of an industrial device.

The information illustrated in FIG. 5 to FIG. 7 is merely example and is not limited thereto. In the permission rule exemplified in FIG. 5 and FIG. 6, the table to be referred to is changed between the daily working time zone and the holiday night time zone, but the present invention is not limited thereto. For example, as exemplified in FIG. 8, a table in which the processing content corresponding to the time zone, the place of the industrial device 40, and the state of the control target device 30 is specified may be provided. For example, the state information storage unit 13b exemplified in FIG. 7 may store therein not only the information indicating the time zone but also information indicating a date (a weekday, a holiday, and the like), may store therein information indicating whether a place is domestic or overseas instead of the prefectures in Japan as the information indicating the place, or may store therein coordinate information and the like indicating a position.

The control unit 12 includes an internal memory for storing therein programs specifying various processing procedures and required data, and executes various kinds of processing with them. As units especially closely related to the present invention, the control unit 12 includes the reception unit 12a, a monitoring unit 12b, a specification unit 12c, and a determination unit 12d. In this case, the control unit 12 is an electronic circuit such as a central processing unit (CPU) and a micro processing unit (MPU), or an integrated circuit such as an application specific integrated circuit (ASIC) and a field programmable gate array (FPGA).

The reception unit 12a receives, from the control target device 30, a notification indicating the state of the control target device 30. For example, the reception unit 12a receives, from the control target device 30, information indicating that the control target device 30 is operating (fully operating) as the notification indicating the state of the control target device 30. As a timing for receiving the notification, the reception unit 12a may periodically receive the notification at predetermined time intervals, or may receive the notification at the time when the state is changed. The reception unit 12a can receive not only the notification from the control target device 30 but also a state notification that is manually input or transmitted from an external system.

The reception unit 12a may receive a notification about the place of the industrial device 40 (for example, Tokyo from the industrial device 40, and may receive a notification about time (for example, the night time zone) from the scheduler 50 together with the notification indicating the state of the control target device 30. When receiving the notification indicating the state, the reception unit 12a stores the notification in the state information storage unit 13b.

The monitoring unit 12b receives the control command transmitted from the control device 20 to the control target device 30. Specifically, when receiving the control command transmitted from the control device 20 to the control target device 30, the monitoring unit 12b notifies the specification unit 12c of the control command.

The specification unit 12c specifies the current state of the control target device 30 based on the notification received by the reception unit 12a, and also specifies the state after transition that is made when the control target device 30 receives the control command received by the monitoring unit 12b. For example, exemplifying the above-described case in which the control target device 30 is a server, the specification unit 12c acquires "fully operating" as the current state from the state information storage unit 13b, and specifies the current state to be "fully operating". In a case in which the control command received by the monitoring unit 12b is a command for instructing to interrupt the power source of the housing, the specification unit 12c specifies the state after transition to be "fully stopping". The specification unit 12c then notifies the determination unit 12d of the specified current state and state after transition.

The determination unit 12d determines whether to permit or block passage of the control command received by the monitoring unit 12b in accordance with the state of the control target device 30 received by the reception unit 12a. Specifically, the determination unit 12d acquires, from the table stored in the permission rule storage unit 13a, the processing content corresponding to the pair of the current state and the state after transition specified by the specification unit 12c, determines whether to permit or block passage of the control command received by the monitoring unit 12b in accordance with the processing content, and notifies the external management monitoring device 60 of an anomaly.

For example, by using the example described above for description, in a case in which the current state is the "fully operating" state, the state after transition is the "fully stopping" state, and the current time zone is "night time zone", the determination unit 12d refers to the permission rule for the holiday and night time zone exemplified in FIG. 6, and acquires the processing content of "prohibition: warning". In this case, the determination unit 12d determines to prohibit (block) passage of the control command, and notifies the management monitoring device 60 of the warning message.

As a result of determination, the determination unit 12d transmits the control command to the control target device 30 when determining to permit the passage, and discards the control command when determining to block the passage.

Figure 9:
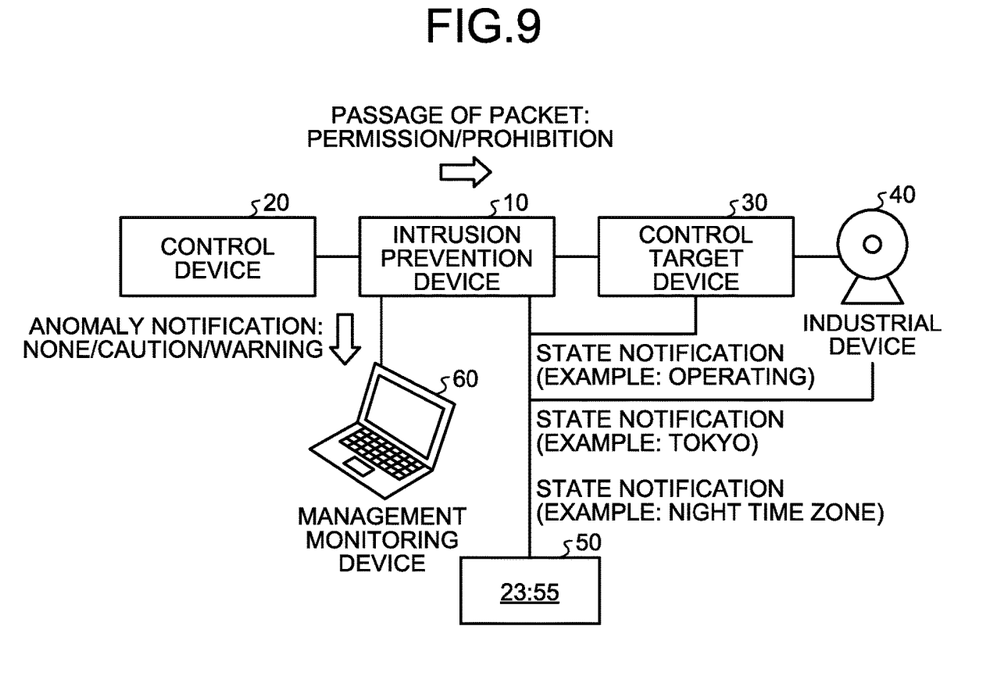
FIG. 9 is a diagram for explaining an outline of processing performed by the intrusion prevention device.

The following describes an outline of the processing performed by the intrusion prevention device 10 with reference to FIG. 9. FIG. 9 is a diagram for explaining the outline of the processing performed by the intrusion prevention device. As illustrated in FIG. 9, the intrusion prevention device 10 receives, from the control target device 30, the notification indicating the state of the control target device 30 (for example, operating (fully operating)). The intrusion prevention device 10 also receives the notification about the place of the industrial device 40 (for example, Tokyo) from the industrial device 40, and receives the notification about the time (for example, the night time zone) from the scheduler 50.

When receiving the control command from the control device 20, the intrusion prevention device 10 determines whether to permit or block passage of the control command received by the monitoring unit 12b in accordance with the state of the control target device 30 received by the reception unit 12a. As a result of determination, when determining to permit the passage, the intrusion prevention device 10 transmits the control command to the control target device 30, and when determining to block the passage, the intrusion prevention device 10 discards the control command.

The intrusion prevention device 10 also notifies the external management monitoring device 60 of an anomaly in accordance with the state of the control target device 30. For example, the intrusion prevention device 10 notifies the management monitoring device 60 of the message for calling for caution to whether a problem is not caused when the control command passes or the message for warning an anomaly in the control command.

Processing Procedure in Intrusion Prevention Device

Figure 10:
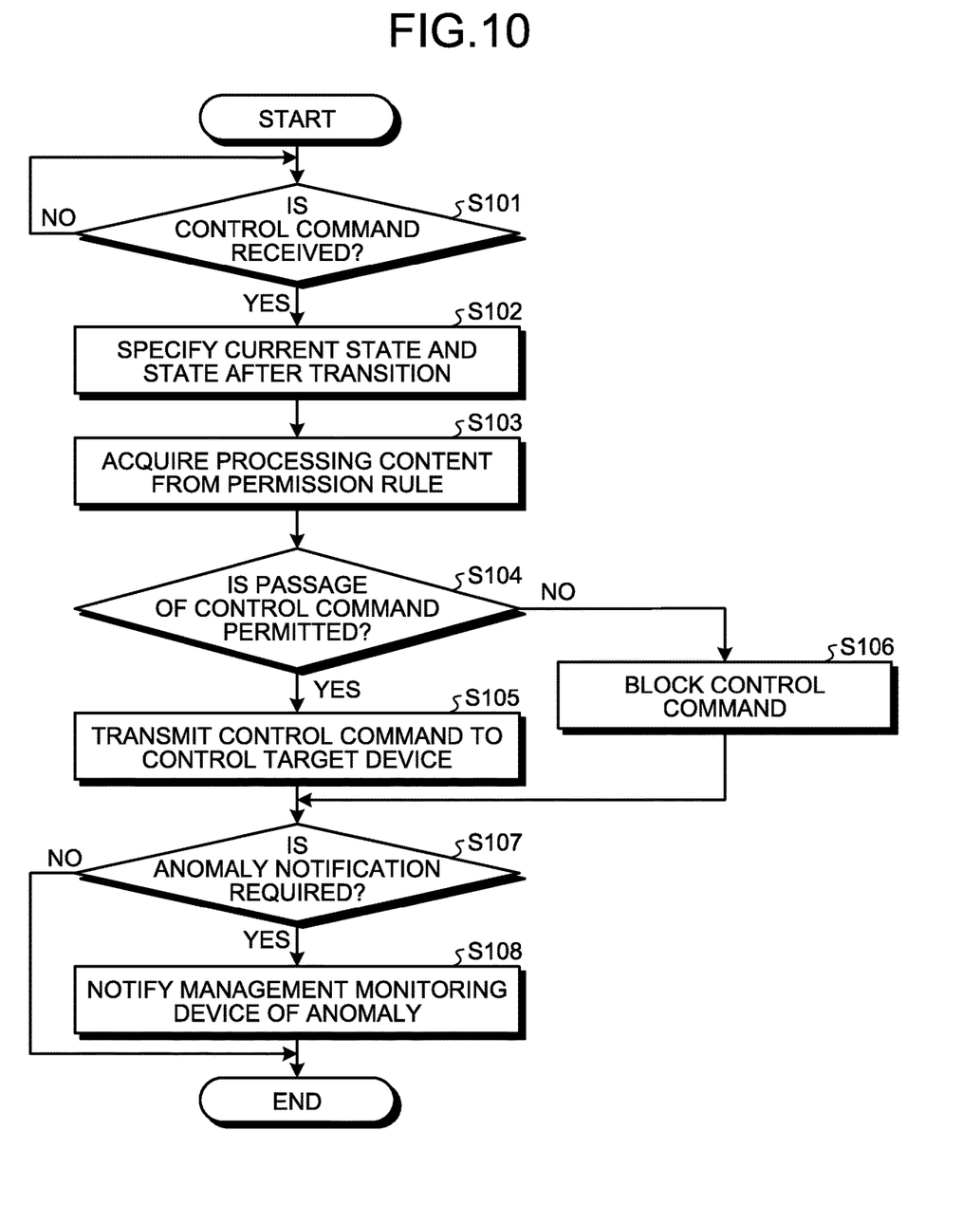
FIG. 10 is a flowchart illustrating an example of a processing flow in the intrusion prevention device according to the first embodiment.

Next, the following describes an example of a processing procedure in the intrusion prevention device 10 according to the first embodiment with reference to FIG. 10. FIG. 10 is a flowchart illustrating an example of a processing flow in the intrusion prevention device according to the first embodiment.

As illustrated in FIG. 10, when the monitoring unit 12b of the intrusion prevention device 10 receives the control command (Yes at Step S101), the specification unit 12c specifies the current state and the state after transition (Step S102). For example, the specification unit 12c acquires "fully operating" as the current state from the state information storage unit 13b, and specifies the current state to be "fully operating". If the control command received by the monitoring unit 12b is a command for instructing to interrupt the power source of the housing, the specification unit 12c specifies the state after transition to be "fully stopping".

The determination unit 12d then acquires, from the permission rule, the processing content corresponding to the pair of the current state and the state after transition specified by the specification unit 12c (Step S103), and determines whether to permit passage of the control command received by the monitoring unit 12b in accordance with the processing content (Step S104).

As a determination result, when determining to permit the passage of the control command (Yes at Step S104), the determination unit 12d transmits the control command to the control target device 30 (Step S105). When determining to block the control command (No at Step S104), the determination unit 12d blocks the control command (Step S106).

Subsequently, the determination unit 12d determines whether an anomaly notification is required to be made based on the processing content (Step S107), and when determining that the anomaly notification is not required to be made (No at Step S107), the determination unit 12d ends the process. When determining that the anomaly notification is required to be made (Yes at Step S107), the determination unit 12d notifies the management monitoring device 60 of an anomaly (Step S108), and ends the process.

Effect of First Embodiment

The intrusion prevention device 10 according to the first embodiment receives, from the control target device 30, the notification indicating the state of the control target device 30. The intrusion prevention device 10 also receives the control command transmitted from the control device 20 to the control target device 30. When receiving the control command, the intrusion prevention device 10 determines whether to permit or block passage of the control command in accordance with the received state of the control target device 30. Accordingly, a normal control command can be appropriately blocked in accordance with the state of the device.

That is, although even a packet conforming to the specification defined as a command that is transmitted for control from the control device 20 to the control target device 30 may cause an abnormal state depending on the state of the control target device 30, the intrusion prevention device 10 according to the first embodiment can block the packet implementing a command that may cause a risk for a system depending on a specific state, by defining the permission rule.

For example, the intrusion prevention device 10 according to the first embodiment can prevent a situation in which an abnormal operation of the control target device 30 poses danger to an important infrastructure itself or a life of a person who uses the infrastructure. By enabling an intrusion coping rule to be applied to each of state groups obtained by multiplying a possible state of the control target device 30 connected to a network by a possible state of the entire control system, it is possible to block a packet implementing a command that may bring danger when being received in a specific situation.

Second Embodiment

In the first embodiment, described is a case in which one intrusion prevention device 10 refers to the permission rule to determine whether to permit or block passage of the control command, but the present invention is not limited thereto. Alternatively, a plurality of intrusion prevention devices may have different permission rules, and each of the intrusion prevention devices may determine whether to permit or block passage of the control command. The following describes a communication control system according to a second embodiment, but description about the same configuration and processing as those in the first embodiment will not be repeated.

Figure 11:
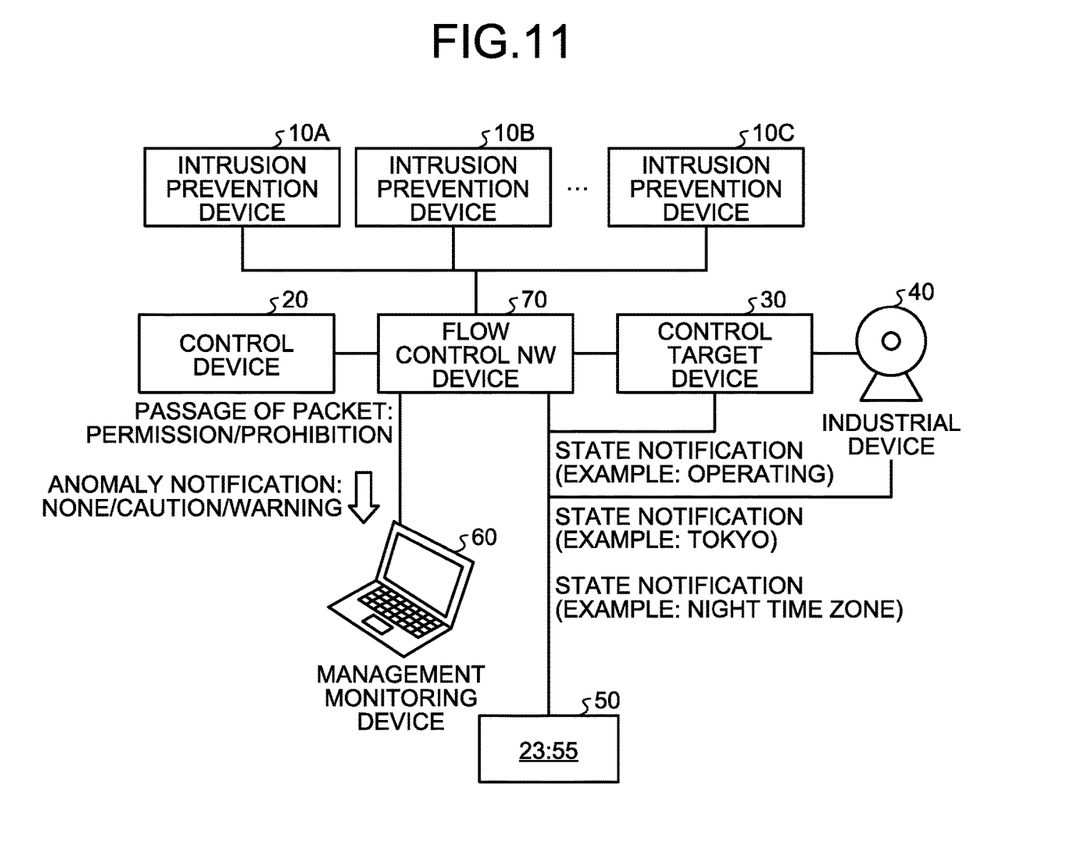
FIG. 11 is a schematic diagram illustrating the entire configuration of a monitoring control network system according to a second embodiment.

As exemplified in FIG. 11, the monitoring control network system according to the second embodiment is different from the monitoring control network system according to the first embodiment in that the monitoring control network system according to the second embodiment includes a plurality of intrusion prevention devices 10A to 10C and a flow control network (NW) device 70. The intrusion prevention devices 10A to 10C store different permission rules. By way of example, the intrusion prevention device 10A stores a permission rule for the daily working time zone, the intrusion prevention device 10B stores a permission rule for the night time zone, and the intrusion prevention device 10C stores the permission rule for holidays.

The flow control NW device 70 is assumed to previously know which permission rule each of the intrusion prevention devices 10A to 10C stores therein. When receiving the control command transmitted from the control device 20 to the control target device 30, the flow control NW device 70 determines to transfer the control command to which of the intrusion prevention devices 10A to 10C. For example, by using the example described above, in a case in which the current time is the "night time zone", the control command is transferred to the intrusion prevention device 10B having the permission rule for the night time zone.

When receiving, from the flow control NW device 70, the control command transmitted from the control device 20 to the control target device 30, each of the intrusion prevention devices 10A to 10C determines whether to permit or block passage of the control command by performing processing similar to that in the first embodiment. When determining to permit the passage, the intrusion prevention devices 10A to 10C instruct the flow control NW device 70 to transmit the control command to the control target device 30. When determining to block the passage, the intrusion prevention devices 10A to 10C instruct the flow control NW device 70 to discard the control command.

When the flow control NW device 70 is instructed to transmit the control command to the control target device 30 by the intrusion prevention devices 10A to 10C, the flow control NW device 70 transmits the control command to the control target device 30. When the flow control NW device 70 is instructed to discard the control command, the flow control NW device 70 discards the control command.

In this way, the intrusion prevention devices 10A to 10C according to the second embodiment receive, from the flow control NW device 70, the control command transmitted from the control device 20 to the control target device 30, determine whether to permit or block passage of the control command in accordance with the state of the control target device 30, instruct the flow control NW device 70 to transmit the control command to the control target device 30 when determining to permit the passage, and instruct the flow control NW device 70 to discard the control command when determining to block the passage. Thus, the control command can be appropriately blocked in accordance with the permission rules stored in the respective intrusion prevention devices 10A to 10C themselves.

Third Embodiment

The embodiments of the present invention have been described above, but the present invention may be implemented with various different forms other than the embodiments described above. The following describes other embodiments encompassed by the present invention.

Security Engine

In the monitoring control network system described above, a security device including a security engine that detects a cyber attack and automatically blocks a packet (for example, a resilient security engine) may be disposed. With this, a packet of a control command aiming at a cyber attack can be blocked, so that a security countermeasure can be implemented to a higher degree.

Log Server

By being combined with a log server defined by a secure monitoring control network system, a packet for control can be passed or blocked in accordance with a state of a system that has learned based on a packet flowing in the monitoring control network system, and man power required for rule design can be reduced.

Interlock Mechanism

By combining the monitoring control network system described above with an interlock mechanism, security can also be secured in an instrumentation device that controls operation of an important portion for security. For example, by combining the monitoring control network system with the interlock mechanism, an operation through a procedure other than a proper procedure can be prevented from being performed due to misoperation or insufficient confirmation.

System Configuration and Others

The components of the devices illustrated in the drawings are merely conceptual, and it is not required that they are physically configured as illustrated necessarily. That is, specific forms of distribution and integration of the devices are not limited to those illustrated in the drawings. All or part thereof may be functionally or physically distributed/integrated in arbitrary units depending on various loads or usage states. All or optional part of processing functions executed by the devices may be implemented by a CPU and a program that is analyzed and executed by the CPU, or may be implemented as hardware by wired logic.

Among the pieces of processing described in the embodiments, all or part of the pieces of processing described to be automatically performed can be manually performed, or all or part of the pieces of processing described to be manually performed can be automatically performed using a known method. The processing procedures, the control procedures, the specific names, and the information including various pieces of data or parameters described herein or illustrated in the drawings can be optionally changed unless otherwise specifically noted.

Program

It is also possible to create a program in which the processing to be executed by the intrusion prevention device described in the above embodiments is written in computer-executable language. For example, it is possible to create an intrusion prevention program in which the processing executed by the intrusion prevention device 10 according to the embodiments is written in computer-executable language. In this case, an effect similar to that of the above embodiments can be obtained when a computer executes the intrusion prevention program. By recording the intrusion prevention program in a computer-readable recording medium, and causing a computer to read and execute the intrusion prevention program recorded in the recording medium, processing similar to that in the above embodiments may be implemented.

Figure 12:
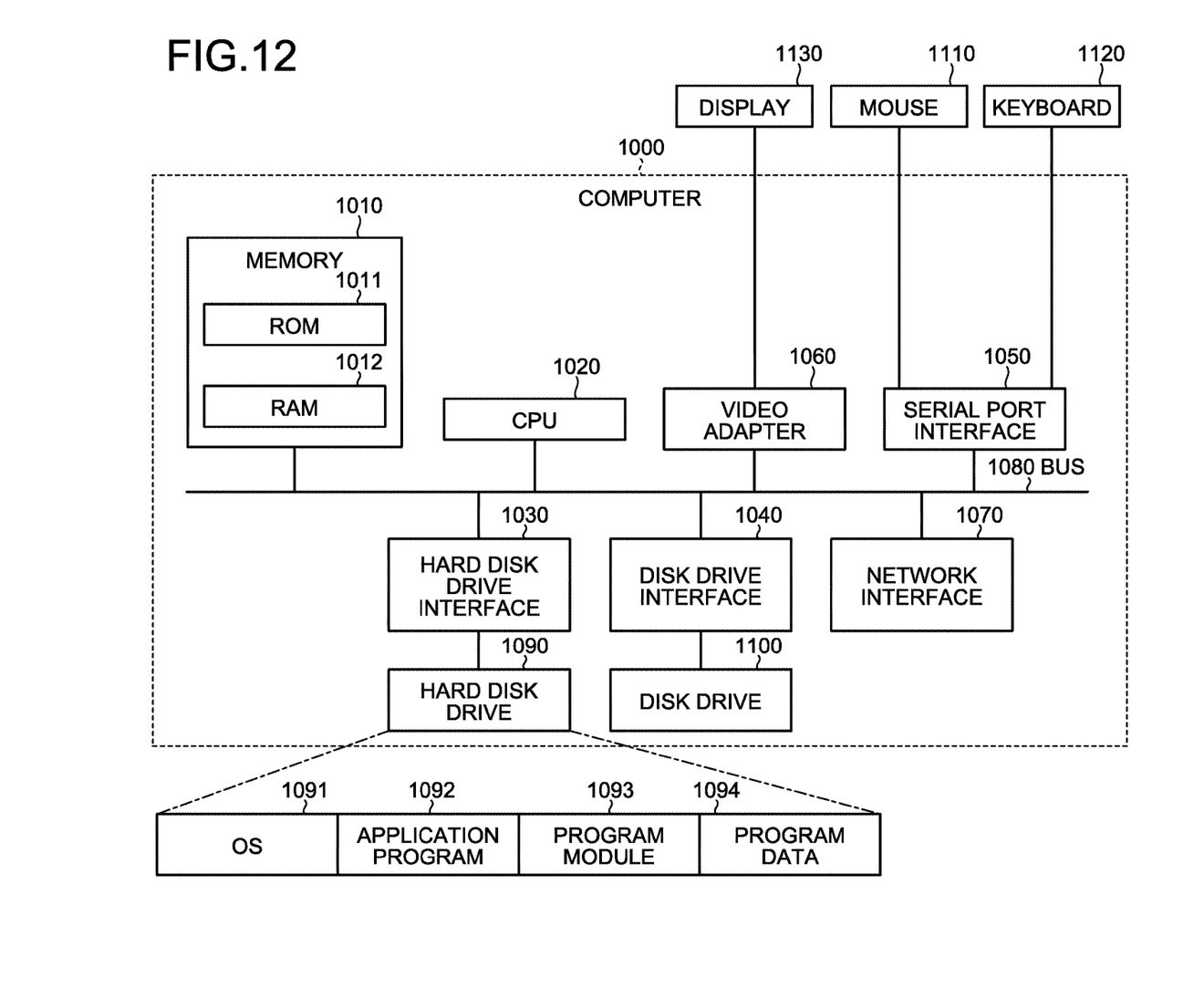
FIG. 12 is a diagram illustrating a computer that executes an intrusion prevention program.

FIG. 12 is a diagram illustrating a computer 1000 that executes the intrusion prevention program. As exemplified in FIG. 12, the computer 1000 includes, for example, a memory 1010, a CPU 1020, a hard disk drive interface 1030, a disk drive interface 1040, a serial port interface 1050, a video adapter 1060, and a network interface 1070. These components are connected to each other via a bus 1080.

As exemplified in FIG. 12, the memory 1010 includes a read only memory (ROM) 1011 and a RAM 1012. The ROM 1011 stores therein, for example, a boot program such as a basic input output system (BIOS). As exemplified in FIG. 12, the hard disk drive interface 1030 is connected to a hard disk drive 1090. As exemplified in FIG. 12, the disk drive interface 1040 is connected to a disk drive 1100. For example, a removal storage medium such as a magnetic disk or an optical disc is inserted into the disk drive 1100. As exemplified in FIG. 12, the serial port interface 1050 is connected to a mouse 1110 and a keyboard 1120, for example. As exemplified in FIG. 12, the video adapter 1060 is connected to a display 1130, for example.

As exemplified in FIG. 12, the hard disk drive 1090 stores therein, for example, an OS 1091, an application program 1092, a program module 1093, and program data 1094. That is, the intrusion prevention program described above is stored, for example, in the hard disk drive 1090 as a program module in which a command executed by the computer 1000 is written.

Various pieces of data described in the above embodiments are stored, for example, in the memory 1010 or the hard disk drive 1090 as program data. The CPU 1020 reads out the program module 1093 or the program data 1094 stored in the memory 1010 or the hard disk drive 1090 into the RAM 1012 as needed, and executes various processing procedures.

The program module 1093 and the program data 1094 related to the intrusion prevention program are not necessarily stored in the hard disk drive 1090. For example, the program module 1093 and the program data 1094 may be stored in a removal storage medium, and read out by the CPU 1020 via a disk drive and the like. Alternatively, the program module 1093 and the program data 1094 related to the intrusion prevention program may be stored in another computer connected via a network (such as a local area network (LAN) or a wide area network (WAN)), and read out by the CPU 1020 via the network interface 1070.

Among the pieces of processing described in the embodiments, all or part of the pieces of processing described to be automatically performed can be manually performed, or all or part of the pieces of processing described to be manually performed can be automatically performed using a known method. The processing procedures, the control procedures, the specific names, and the information including various pieces of data or parameters described herein or illustrated in the drawings can be optionally changed unless otherwise specifically noted.

The embodiments described above and modifications thereof are encompassed by the technique disclosed in the present application, and also encompassed by the invention described in the claims and equivalents thereof.

REFERENCE SIGNS LIST 10, 10A to 10C Intrusion prevention device
11 Communication processing unit
12 Control unit
12a Reception unit
12b Monitoring unit
12c Specification unit
12d Determination unit
13 Storage unit
13a Permission rule storage unit
13b State information storage unit
20 Control device
30 Control target device
40 Industrial device
50 Scheduler
60 Management monitoring device
70 Flow control NW device

The invention claimed is:

1. An intrusion prevention device comprising:
a processor; and
a memory wherein the processor is configured to
receive, from a control target device connected to an industrial device, a notification indicating a current state of the control target device;
receive, from the industrial device, a notification about a place of the industrial device,
receive, from a scheduler that managers current date and time, a notification indicating time,
receive a control command transmitted from a control device to the control target device, and
specify a current state of the control target device, a current time zone, and a place of the industrial device based on the notification received, and specify a state after transition that is made in a case in which the control target device receives the control command,
wherein the memory stores therein a table in which processing content indicating whether to permit or block passage of the control command is specified in advance for each combination of a current state of the control target device, a state after transition made by receiving the control command, a time zone, and a place of the industrial device, and
wherein the processor is further configured to
acquire, from the table stored in the storage unit, the processing content corresponding to the combination of the current state of the control target device, the state after transition, the current time zone, and the place of the industrial device that are specified, and
determine whether to permit or block passage of the received control command received in accordance with the acquired processing content.

2. The intrusion prevention device according to claim 1, wherein
in the table, whether to notify an external device of an anomaly is specified as the processing content, and
the processor configured to
acquire, from the table stored in the memory, the processing content corresponding to the combination of the current state of the control target device, the state after transition, the current time zone, and the place of the industrial device specified, and
in accordance with the acquired processing content, determine whether to permit or block passage of the control command received and notifies the external device of an anomaly.

3. The intrusion prevention device according to claim 1, wherein the processor configured to
determine whether to permit or block passage of the received control command received in accordance with the combination of the current state of the control target device, the state after transition of the control target device, the current time zone, and the place of the industrial device,
transmit the control command to the control target device when determining to permit the passage, and
discard the control command when determining to block the passage.

4. The intrusion prevention device according to claim 1, wherein
the processor is configured to
receive, from a network device, the control command transmitted from the control device to the control target device, and determine whether to permit or block passage of the control command received in accordance with the combination of the current state, the state after transition of the control target device, the current, time zone and the place of the industrial device, instruct the network device to transmit the control command to the control target device when determining to permit the passage, and instruct the network device to discard the control command when determining to block the passage.

5. An intrusion prevention method executed by an intrusion prevention device, the method comprising:

receiving, from a control target device connected to an industrial device, a notification indicating a current state of the control target device;

receiving, from the industrial device a notification about a place of the industrial device;

receiving, from a scheduler that managers current date and time, a notification indicating time;

receiving a control command transmitted from a control device to the control tar e device;

specifying a current state of the control target device, a current time zone, and a place of the industrial device based on the notification received, and specifying a state after transition that is made in a case in which the control target device receives the control command;

storing, in a memory, a table in which processing content indicating whether to permit or block passage of the control command is specified in advance for each combination of a current state of the control target device, a state after transition made by receiving the control command, a time zone, and a place of the industrial device;

acquiring, from the table stored in the memory, the processing content corresponding to the combination of the current state of the control target device, the state after transition, the current time zone, and the place of the industrial device that are specified; and determining whether to permit or block passage of the received control command in accordance with the acquired processing content.

6. A non-transitory computer-readable recording medium containing an intrusion prevention program for causing a computer to execute:

receiving, from a control target device connected to an industrial device, a notification indicating a current state of the control target device;

receiving from the industrial device, a notification about a place of the industrial device;

receiving, from a scheduler that manages current date and time, a notification indicating time;

receiving a control command transmitted from a control device to the control target device;

specifying a current state of the control target device, a current time zone, and a place of the industrial device based on the notification received, and specifying a state after transition that is made in a case in which the control target device receives the control command;

storing, in a memory, a table in which processing content indicating whether to permit or block passage of the control command is specified in advance for each combination of a current state of the control target device, a state after transition made by receiving the control command, a time zone, and a place of the industrial device;

acquiring, from the table stored in the memory, the processing content corresponding to the combination of the current state of the control target device, the state after transition, the current time zone, and the place of the industrial device that are specified; and determining whether to permit or block passage of the received control command in accordance with the acquired processing content.

\* \* \* \* \*